United States Patent [19]

Baruchello

[11] Patent Number: 5,746,003
[45] Date of Patent: May 5, 1998

[54] GAUGES FOR CHECKING LINEAR DIMENSIONS

[75] Inventor: Roberto Baruchello, Baricella, Italy

[73] Assignee: Marposs Societa Per Azioni, Italy

[21] Appl. No.: 569,260

[22] PCT Filed: Jun. 20, 1994

[86] PCT No.: PCT/EP94/01995

§ 371 Date: Dec. 22, 1995

§ 102(e) Date: Dec. 22, 1995

[87] PCT Pub. No.: WO95/01547

PCT Pub. Date: Jan. 12, 1995

[30] Foreign Application Priority Data

Jul. 1, 1993 [IT] Italy .................... BO93A0311

[51] Int. Cl.$^6$ .................................................. G01B 7/02
[52] U.S. Cl. .............................................. 33/542; 33/556
[58] Field of Search ....................... 33/542, 544, 544.1, 33/544.3, 542.1, 555.1, 556, 559, 783, 806, 813, 827, 832

[56] References Cited

U.S. PATENT DOCUMENTS

| | | |
|---|---|---|
| 2,799,092 | 7/1957 | Abramson ..................... 33/542 |
| 4,419,829 | 12/1983 | Miller . |
| 4,420,889 | 12/1983 | Possati et al. . |
| 4,434,557 | 3/1984 | Meyer, Jr. . |
| 4,651,430 | 3/1987 | Vasku . |
| 4,753,555 | 6/1988 | Thompson . |
| 4,788,772 | 12/1988 | Van Sickle et al. . |
| 4,926,559 | 5/1990 | Knäbel . |
| 5,067,250 | 11/1991 | Auweiler et al. ................ 33/783 |
| 5,259,119 | 11/1993 | Yoshioka et al. ................ 33/542 |
| 5,355,589 | 10/1994 | Madlener et al. ................ 33/556 |

FOREIGN PATENT DOCUMENTS

| | | |
|---|---|---|
| 327670 | 8/1989 | European Pat. Off. . |
| 2483601 | 6/1981 | France . |
| 332807 | 1/1989 | France . |
| 3218652 | 11/1983 | Germany . |

Primary Examiner—Thomas B. Will
Assistant Examiner—Andrew Hirshfeld
Attorney, Agent, or Firm—Dickstein Shapiro Morin & Oshinsky LLP

[57] ABSTRACT

A gauge for checking linear dimensions of mechanical parts (41) comprises a support casing (4) substantially arranged along a longitudinal direction, and housing a transducer unit (5). The transducer unit (5) includes an axially movable rod (12). A ball-shaped element (23), moveable depending on the dimension of the mechanical part, is fixed at an end of an elongate element (22), having a second end coupled to the moveable rod (12) and a flexible cylindrical section (30). An abutment member (25) defines an inclined surface portion (26), having a Vee cross-section, for housing and guiding the ball shaped element (23).

16 Claims, 4 Drawing Sheets

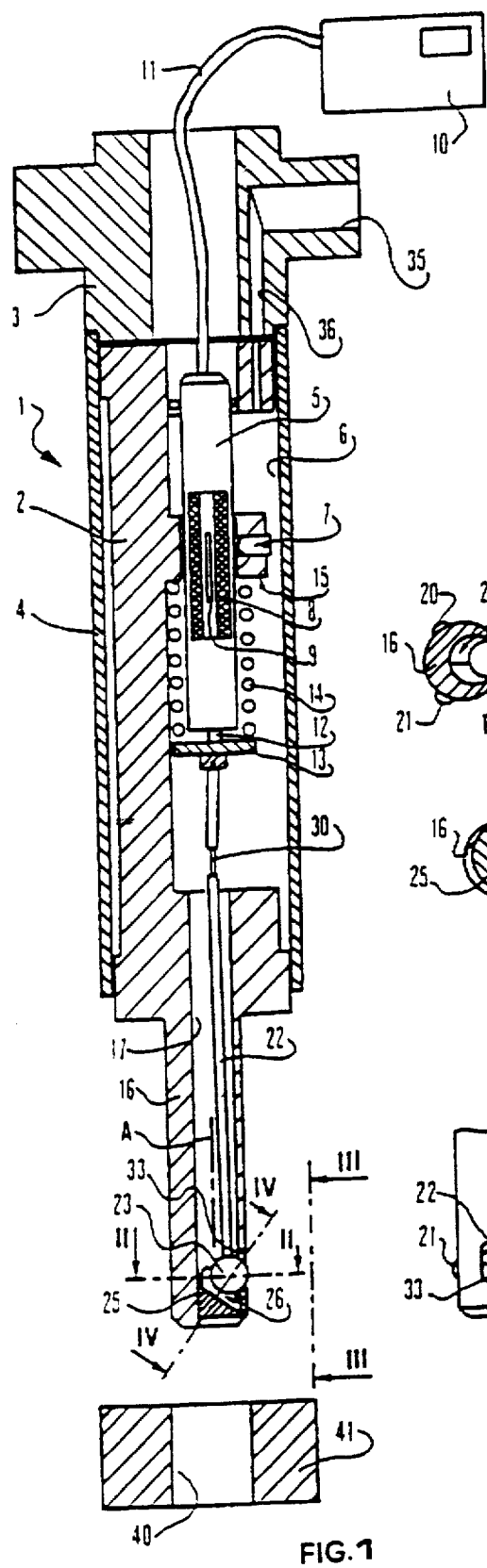
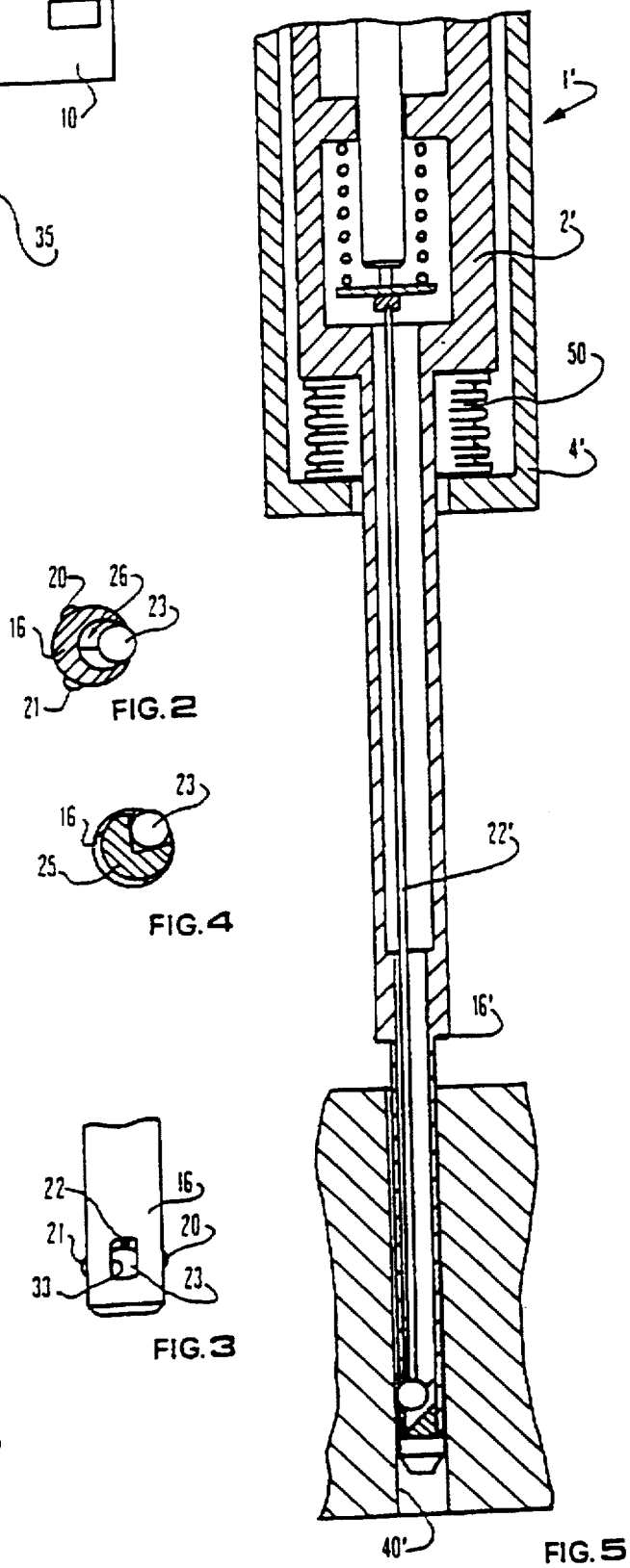
FIG. 1  FIG. 2  FIG. 3  FIG. 4  FIG. 5

GAUGES FOR CHECKING LINEAR DIMENSIONS

TECHNICAL FIELD

The present invention relates to a gauge for checking linear dimensions of mechanical parts comprising a support casing substantially arranged along a longitudinal direction; a transducer unit coupled to the support casing and including a movable rod, substantially movable along said longitudinal direction; a substantially ball-shaped element, movable depending on variations of said linear dimensions along a direction transverse to said longitudinal direction; an elongate element, substantially arranged along said longitudinal direction, the elongate element carrying at a first end said ball-shaped element and having a second end coupled to said movable rod; and an abutment member defining a surface portion arranged along a direction inclined with respect to said longitudinal direction and transverse direction, said ball-shaped element being into contact with said surface portion and movable on it along said inclined direction.

BACKGROUND ART

U.S. Pat. No. 4,926,559 discloses a measuring device for determining the position of workpiece faces and for similar applications by means of a single contacting feeler. The device includes a casing defining a longitudinal axis; a transducer unit; an elongate element carrying at an end a ball element; a leaf spring-arranged (in rest condition) along a determined plane-, for coupling the other end of the elongate element to the transducer unit; and a member defining a plane abutment surface, inclined to the longitudinal axis. During measurement, the elongate element and the workpiece are mutually displaced and the ball element can contact, directly or through other elements, a point of the workpiece. Due to the contact of the ball element with the inclined surface and the bending of the leaf spring, the transversal deviations of the workpiece dimension from a nominal dimension cause displacement of a movable member of the transducer unit along the longitudinal axis.

In this device, the use of a flat abutment surface and of a leaf spring can give rise to drawbacks. For example, the accuracy and repeatability of the measurements can be jeopardized by torsional forces possibly acting on the leaf spring.

U.S. Pat. No. 2,842,858 discloses a gauge comprising a casing and two feeler balls coupled to the casing through flexible stems for performing mutual movements towards and away from each other. The balls are into contact with symmetrical inclined surfaces of a central prismatic element coupled to a rod that can perform longitudinal translations.

This gauge, as other conventional gauges having a similar structure, cannot be easily used for checking small and deep holes, owing to the not negligible transversal dimensions of the two movable balls and of the central prismatic element.

Moreover, the transmission of movement between the prismatic element and the balls, and the associated slidings on the inclined surfaces can cause inaccuracy and poor repeatability of the gauge. It is also necessary, when assembling the gauge, to fix with great care the position of the balls, in order to guarantee the proper cooperation between the prismatic element and the balls.

The symmetrical arrangement required for the movable balls involves a correct centering between the axis of the hole to be checked and the gauge axis.

DISCLOSURE OF THE INVENTION

Object of the present invention is to provide an accurate and reliable gauge having a particularly simple, compact and inexpensive structure.

This and other objects are achieved by a gauge for checking linear dimensions, comprising a support casing substantially arranged along a longitudinal direction; a transducer unit coupled to the support casing and including a movable rod, substantially movable along said longitudinal direction; a substantially ball-shaped element, movable depending on variations of said linear dimensions along a direction transverse to said longitudinal direction; an elongate element, substantially arranged along said longitudinal direction, the elongate element carrying at a first end said ball-shaped element and having a second end coupled to said movable rod; and an abutment member defining a surface portion arranged along a direction inclined with respect to said longitudinal direction and transverse direction, said ball-shaped element being into contact with said surface portion and movable on it along said inclined direction, the surface portion featuring a shape, such as a concave shape, adapted to provide a seat for said ball-shaped element and to guide it along said inclined direction.

Preferably, the surface portion features a Vee cross-section.

For measuring internal diameters of holes, the gauge includes at least one movable feeler for contacting the surface of the hole to be checked. The movable feeler can be provided by said ball-shaped element or by an additional element transmitting displacements to the ball-shaped element. Further feelers, preferably one or two further feelers, also contact the surface of the hole to be checked.

Preferably, the further feeler or feelers are fixed to a protection member adapted to enter into the hole to be checked.

Preferably, a centering device permits small displacements of said protection member, in particular for automatically checking internal diameters, or small displacements of the arm-set supporting the feelers with respect to the protection member, in particular for manual gauging.

For measuring external diameters, the gauge preferably includes a substantially arcuate support, a feeler fixed to a leg of the arcuate support and a movable feeler, that can be provided by said ball-shaped element. The arcuate support is carried by a centering device permitting both the fixed feeler and the movable feeler to contact diametrally opposite points of the part.

Preferably, said elongate element, or a portion of the elongate element, is flexible along any transverse direction.

The direct coupling, without transmission devices, between said ball-shaped element and the transducer unit and the provision of a guide for guiding displacements of the ball-shaped element along the inclined direction permit to achieve high accuracy and repeatability, and other advantages, that will become more apparent hereinafter.

BRIEF DESCRIPTION OF THE DRAWINGS

The invention is now described with reference to the enclosed drawings, given by way of non-limiting example, wherein:

FIG. 1 is a longitudinal sectional view of a plug gauge according to a first embodiment of the invention, FIG. 2 is a transversal sectional view of the gauge of FIG. 1, along path II—II in FIG. 1, FIG. 3 is a lateral view of a detail of FIG. 1, along direction III—III in FIG. 1, FIG. 4 is a partial, oblique sectional view of the gauge of FIG. 1, along path IV—IV in FIG. 1, FIG. 5 is a longitudinal sectional view of a plug gauge according to a different embodiment of the invention.

BEST MODES FOR CARRYING OUT THE INVENTION

Figure 6:
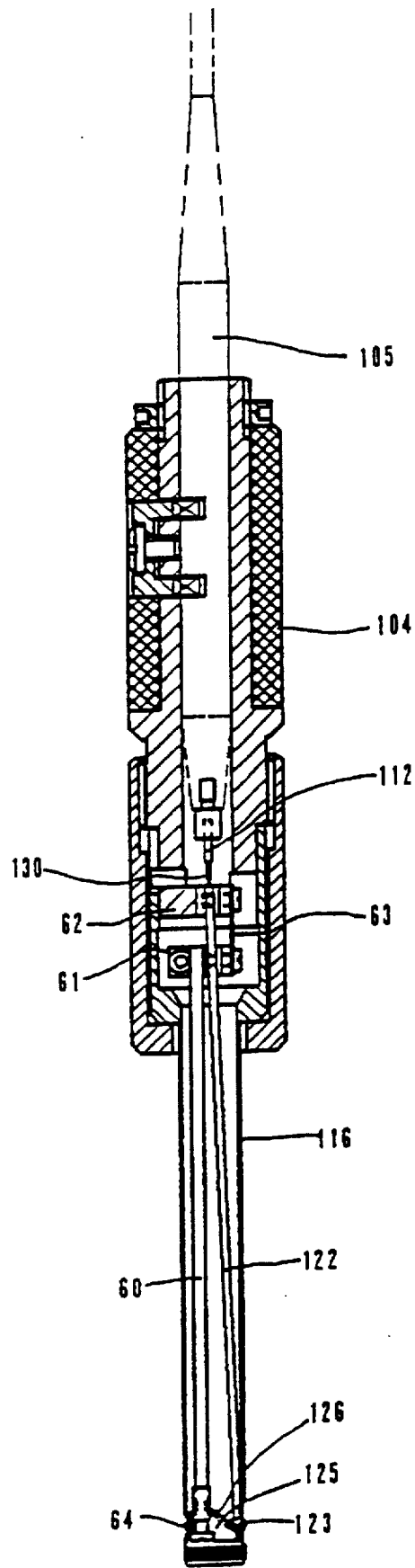
FIG. 6 is a longitudinal sectional view of a manual plug gauge according to a another embodiment of the invention.

The gauge shown in FIG. 1 comprises support and protection means 1 with a central body 2, defining a longitudinal axis A, a terminal connection element 3, and an outer tubular casing 4. A transducer unit, or gauging head 5 is arranged in a chamber 6 defined by central body 2 and by tubular casing 4 and is fixed in an adjustable way, by means of a screw 7, in a longitudinal position, off-set with respect to axis A. Head 5 is of a known type, e.g. an axial cartridge head, and includes transducer means, such as a differential transducer, of which the figure schematically shows first elements, or stationary windings 8, and second elements, with a movable core 9. A processing and display unit, schematically shown in the figure by reference number 10, is connected to the differential transducer by a cable 11.

Core 9 is coupled to a movable part or rod 12 of head 5. An end of movable part 12 carries an annular flange 13, and a compression spring 14 is arranged between flange 13 and an end stop surface 15 of central body 2.

Central body 2 has a terminal portion 16, substantially cylindrical, that protrudes from tubular casing 4 and defines a longitudinal through opening 17, symmetrical about axis A and partially extending in portion 16. Two first feelers 20 and 21, visible in FIG. 2, are fixed to the terminal portion 16 of body 2, arranged at an angular mutual distance of 120° about axis A.

An elongate element, or movable stem 22 is housed in longitudinal opening 17 and has a first end coupled to flange 13 by a threaded coupling. A ball 23 constitutes a movable feeler and is fixedly coupled to a second end of stem 22.

An abutment member 25 housed within longitudinal opening 17 is secured to terminal portion 16, next to an end thereof. Abutment member 25 defines a guiding surface portion 26, inclined to the longitudinal axis A and having a Vee cross-section. Ball 23 is biased, by the action of spring 14 on stem 22, against the zones of surface portion 26 corresponding to the sides of the V.

Stem 22 has a cylindrical portion 30, with reduced diameter, that can bend, thus permitting mutual displacements between the end of stem 22 carrying feeler ball 23 and the end of stem 22 coupled to flange 13.

A lateral slot 33, more clearly shown in FIG. 3, is provided in the terminal portion 16 of body 2, next to surface portion 26, and features a transversal dimension smaller than the diameter of ball 23.

Ball 23, due to the thrust applied by spring 14 to stem 22 and to the slope of surface portion 26, contacts the internal edge of slot 33.

The rest position of the movable feeler 23 is thus defined by the action of spring 14 on stem 22 and by the references provided by surface portion 26 and by the internal edge of slot 33. In this position, the spherical surface of feeler 23 partially protrudes from the outer surface of terminal portion 16, the three feelers 20, 21 and 23 have contacting areas (for contacting the part to be checked) substantially arranged on a plane perpendicular to the longitudinal direction parallel to axis A, and the portion 30 of stem 22 is slightly bent.

Further openings 35 and 36, communicating with each other, are formed in connection element 3 and in body 2, and enable to blow in compressed air to the inside of tubular casing 4. The air can pass through chamber 6 and opening 17 and is forced to escape through slot 33 (and through other possible transversal holes, not shown, of portion 16), for removing any chips or other foreign matter from the surface of a hole 40, to be checked, in a mechanical part 41.

The gauge is coupled to an external support, for example a movable slide, by known centering elements, not shown in FIG. 1, that enable the gauge to perform small oscillating movements about a point or an axis, in order to ensure the proper insertion of cylindrical portion 16 into the hole 40 to be checked, in the event the relative axes are not perfectly aligned.

The operation of the gauge of FIGS. 1–4 is as follows. After the gauge has been calibrated on a master part having known dimensions, in a manner similar to that described hereinafter, it is displaced, e.g. by the above-mentioned slide, towards part 41 and inserted into hole 40. The movable feeler 23, when entering into contact with the surface of hole 40, is radially urged towards the interior of opening 17 and the contacting areas of the feelers 20, 21 and 23, due to the oscillations allowed by the centering elements, arrange themselves into contact with the hole surface in correspondence with a diametral cross-section to be checked. Under this condition, portion 16 of body 2 is referenced with respect to part 41 due to the contact between fixed feelers 20 and 21 and the surface of hole 40. The displacement of ball 23 is guided by the Vee surface portion 26, and causes a substantially axial translation of stem 22, and consequently of movable part 12 of head 5, and of core 9, with respect to stationary windings 8. Corresponding electric signals are provided by head 5 to unit 10, and the diameter of hole 40 is checked by a processing of the signals.

Thus, the particularly simple structure of the gauge enables an equally simple operation. In particular, the direct coupling between ball 23 and the movable rod 12, both fixed to stem 22, and the use of a shaped surface, such as surface portion 26, for guiding displacements of ball 23 along an inclined direction, ensure a safe and repeatable operation, thus avoiding errors that, in the conventional gauges, can be caused by possible undesired displacements among feelers and transducers, and/or by the presence of several additional elements for the mechanical transmission of the displacements of the feelers. The provision of both the cylindrical portion 30, with reduced diameter, and the guide constituted by the Vee surface portion 26, besides ensuring a high repeatability of the gauge, prevents the transmission of significant transversal stresses from feeler 23 to the movable rod 12 of head 5, that might affect the proper axial displacement of rod 12. This feature is important, for example, in connection with gauging applications involving mutual axial rotations between the gauge and the part 41.

It should be realized that the axial component of the displacement of ball 23 with respect to the theoretical diametral cross-section to be checked does not significantly affect the operation of the gauge, because, also in view of the dimension of the same ball 23 and of the type of parts 41, generally the differences in the dimensions of the contiguous cross-sections involved are absolutely negligible.

The compact structure of the gauge, in which the displacements of core 9 are directly caused by those of feeler 23, without intermediate mechanical transmission means including separate and mutually movable elements, also enables the use of compressed air blown in through opening 35 of terminal element 3, as above mentioned. In fact, the air does not affect in this case the proper operation of the gauge, as would occur in the event possible different transmission elements, possibly involving plays and friction, were exposed to the not negligible impact of compressed air. The compressed air is used to clean the surface of the hole 40 to be checked and to prevent any chips and other foreign matter from entering inside the gauge, so that appropriate sealing gaskets are unnecessary.

The gauge according to the present invention is particularly suitable for checking deep holes having small diameter, on the one hand due to the simple constructional structure, permitting to make cylindrical portions 16 having very small dimensions, and on the other hand in view of the direct connection among ball 23, stem 22 and head 5, that guarantees excellent operation even if movable feeler 23 and head 5 are considerably spaced apart.

FIG. 5 shows a plug gauge, substantially similar to that of FIGS. 1–4, suitable for this type of gauging applications, in particular for automatically checking deep holes having small diameter.

The main differences with respect to the first embodiment are the lack of cylindrical portion 30, with reduced diameter, and the provision, in the support and protection means 1', of an internal centering device including, for example, a metal bellows 50. In this case, the function of portion 30 is obtained in view of the specific flexibility of stem 22', and body 2' is connected to tubular casing 4' through bellows 50, enabling small displacements of mutual oscillation between body 2' and casing 4', with respect to a longitudinal axis. These displacements enable the proper insertion of terminal portion 16' into the hole 40' to be gauged even in the case of non-perfect alignment between their axes.

The operation of the gauge of FIG. 5 is like that previously described with reference to FIGS. 1–4.

The embodiments of the invention shown in FIGS. 1 to 5 are particularly adapted for checking internal dimensions in automatic gauging machines, automatic gauges applied in transfer lines, and other automatic gauging applications. However, the invention can be used to make gauges adapted for other applications, such as manual plug gauges, gauging heads for measurement of external diameters by means of two feelers, and gauging heads having a single feeler.

The manual plug gauge shown in FIG. 6 comprises a hollow casing 104 providing a handle for the operator. A protection and centering nosepiece 116 is rigidly coupled to casing 104.

A gauging head 105, in particular a cartridge axial head, is fixed to casing 104 and arranged in the internal opening of the same casing 104.

A stem 122 carries at an end a ball-shaped feeler 123, passing through an opening of nosepiece 116 and protruding from the outer surface of the nosepiece 116 to contact a point of the surface of the hole to be checked. Ball-shaped feeler 123 is in sliding contact with a Vee shaped guiding surface portion 126 of an abutment member 125. Abutment member 125 is secured to the lower end of a rod 60 having its upper end secured to a coupling member 61 featuring a central opening for the passage of stem 122, with suitable clearance.

A flange 62 fixed to casing 104, and featuring a central opening for the passage of stem 122, with suitable clearance, movably supports coupling member 61 by means of a fulcrum, e.g. a leaf spring 63. Leaf spring 63 is arranged, substantially, along a plane perpendicular to the plane of the drawing. The center of ball shaped-feeler 123 lies, substantially, in the same plane defined by leaf spring 63 or at a small distance from it.

A second feeler 64 is secured to, and movable with, abutment member 125 and passes through another opening of the nosepiece 116 to contact a point of the surface of the hole to be checked diametrically opposed to that contacted by feeler 123.

The movable rod 112 of cartridge head 105 is axially biased downwardly by a spring (not visible) of the cartridge head and is coupled to a flexible cylindrical portion 130, with reduced diameter, of stem 122. Flexible portion 130 and leaf spring 63, that acts as a centering device, guarantee the contact of both feelers 123 and 64 with the surface of the hole to be checked, by permitting angular displacements of stem 122 and of rod 60.

Figure 7:
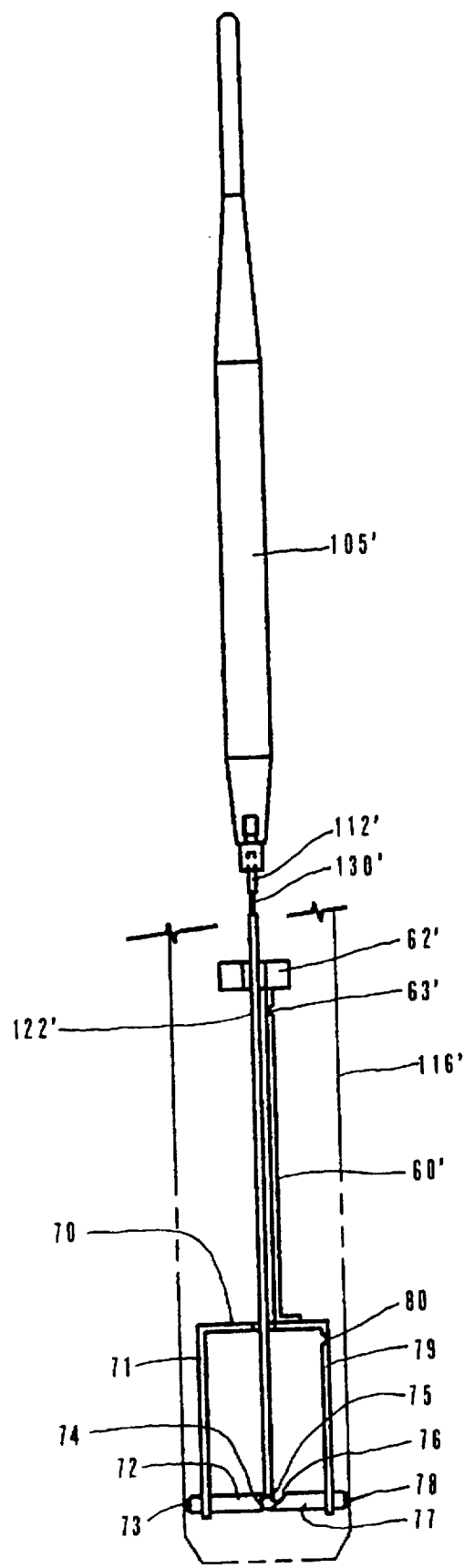
FIG. 7 shows, in a schematic way, a variant to the embodiment of FIG. 6.

FIG. 7 shows, in schematic form, a manual plug gauge according to a variant with respect to the embodiment of FIG. 6. Differently from that of FIG. 6, this plug gauge is adapted for checking rather large diameters.

The plug gauge of FIG. 7 is conceptually similar to that of FIG. 6 and therefore the scheme of FIG. 7 refers only to the substantial differences between the two embodiments. A stem 122' is coupled to the movable rod 112' of a cartridge head 105', through a flexible cylindrical portion 130' featuring a reduced diameter.

A flange 62', fixed with respect to a nosepiece 116', and featuring a central opening for the passage of stem 122', pivotably supports, through a fulcrum 63', a rod 60'. Fulcrum 63' defines a rotation axis perpendicular to the plane of the drawing.

A substantially horizontal connecting element 70, fixed to the lower end of rod 60' and featuring an opening for the passage of stem 122', rigidly supports a vertical element 71 carrying a reference element 72, arranged horizontally. A feeler 73 is secured to an end of reference element 72 and protrudes with respect to nosepiece 116', passing through an opening of it.

The other end of reference element 72 defines a planar vertical reference surface 74, which is into contact with a ball 75 fixed to the lower end of stem 122'. Ball 75 is also into contact with a guiding surface portion 76 of an abutment member 77, arranged horizontally. Surface portion 76 has a concave cross-section, such as a Vee cross-section, and is inclined with respect to the longitudinal axis of the gauge.

A feeler 78 is secured to an end of abutment member 77 and protrudes with respect to nosepiece 116', passing through an opening of it.

Abutment member 77 is secured to the lower end of another vertical element 79, which is coupled to horizontal connecting element 70 by means of a fulcrum 80, arranged at the upper end of vertical element 79. Fulcrum 80 defines a rotation axis perpendicular to the plane of the drawing. The mutual approach between feelers 73 and 78 causes ball 75 to slide on surfaces 74 and 76 and to transmit, through stem 122' and flexible portion 130', a longitudinal displacement to the rod 112' of gauging head 105'.

Figure 8:
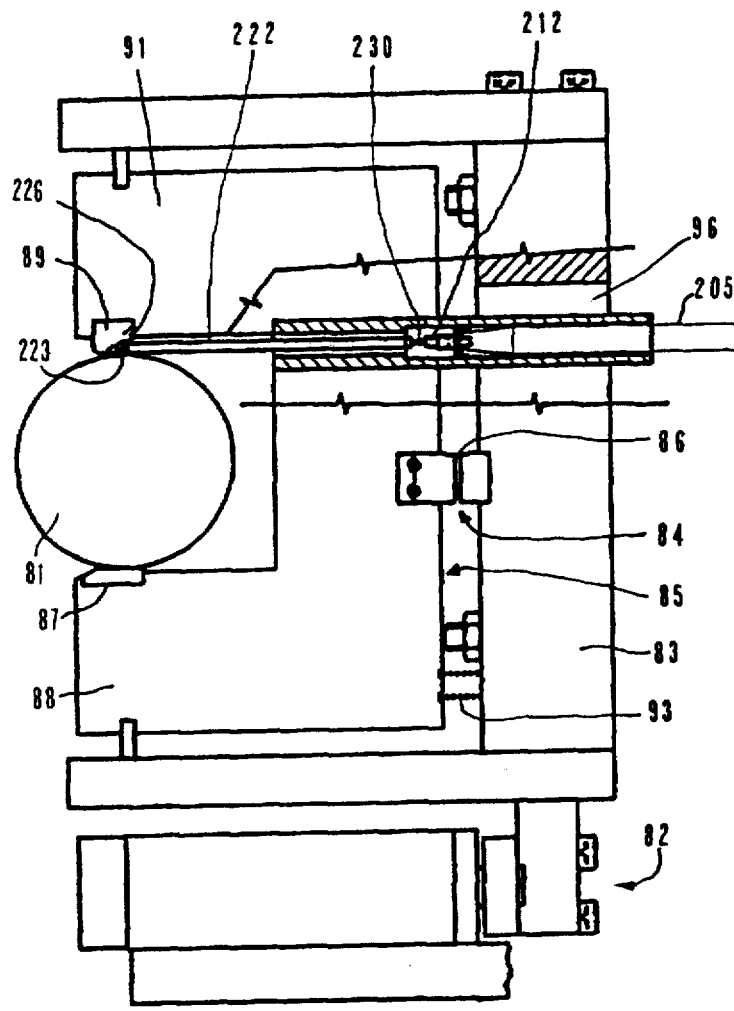
FIG. 8 is a side view, partially cross-sectioned, of a gauging device for checking external diameters, according to a further embodiment of the invention.
Figure 9:
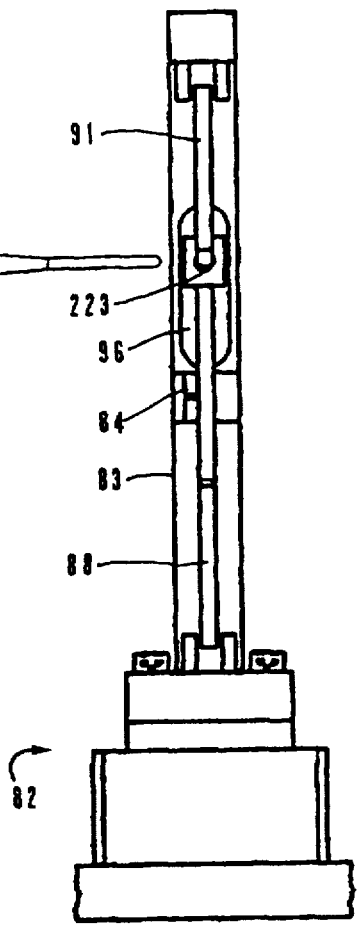
FIG. 9 is a front view of the gauging device of FIG. 8.
Figure 10:
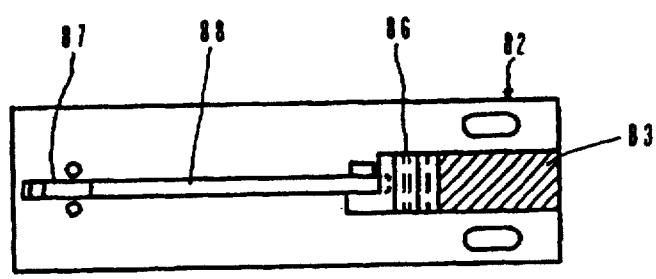
FIG. 10 is a cross-section of the gauging device of FIGS. 8 and 9.

FIGS. 8–10 show a gauging head for checking external diameters of cylindrical parts 81.

A movable slide 82 carries a stanchion 83, that supports, through a coupling device 84, a C-shaped rigid member 85. Coupling device 84 permits small rotation displacements of member 85 about an axis defined by an integral fulcrum 86. The rotation axis defined by fulcrum 86 is parallel to the geometric axis of the part 81 being checked and perpendicular to the plane of FIG. 8.

A fixed feeler 87 is secured to the internal side of the lower leg 88 of member 85 and an abutment member 89 defining a guiding surface portion 226 is secured to the internal side of the upper leg 91 of member 85. Surface portion 226 is inclined with respect to the horizontal and vertical directions and features a Vee cross-section.

A movable feeler, constituted by a ball 223, slidable on surface portion 226, can contact a point of part 81 diametrically opposed to that contacted by fixed feeler 87. The simultaneous contact of both feelers 87 and 223 is guaranteed by integral fulcrum 86 and by a spring 93 arranged between stanchion 83 and member 85.

The displacements of ball 223 on Vee surface portion 226 cause axial displacements of the movable part or rod 212 of a cartridge head 205, due to a flexible cylindrical portion 230, with reduced diameter, of a stem 222 carrying ball 223.

Cartridge head 205 is secured to member 85 and thus can oscillate with it. An opening 96 in stanchion 83 permits the passage of head 205.

The gauges according to FIGS. 5 and 8–10 can be advantageously provided with ducts for compressed air to clean the surface of the part to be gauged, in a similar way to that described in connection with FIGS. 1–4.

It is evident that, as already mentioned, the invention can be used for making gauges having a single feeler, for applications similar to those referred to in U.S. Pat. No. 4,926,559. For this purpose, the embodiment of FIGS. 1–4, for example, can be modified by eliminating the fixed feelers 20 and 21 and by using a movable slide without elements permitting oscillating movements of the gauge.

I claim:

1. Gauge for checking linear dimensions of mechanical parts comprising:

a support casing substantially arranged along a longitudinal direction;

a transducer unit coupled to the support casing and including a movable rod, substantially movable along said longitudinal direction;

a substantially ball-shaped element, movable depending on variations of said linear dimensions along a direction transverse to said longitudinal direction;

an elongate element, substantially arranged along said longitudinal direction, carrying at a first end said ball-shaped element, having a second end coupled to said movable rod by a connection element, said connection element permitting said ball-shaped element to perform displacements with respect to said movable rod, the connection element having a shape symmetrical about a geometrical axis lying substantially along said longitudinal direction, said connection element being configured to permit the ball-shaped element to perform said displacements substantially along all directions perpendicular to said longitudinal direction; and an abutment member defining a surface portion arranged along a direction inclined with respect to said longitudinal direction and said transverse direction, said ball-shaped element being in contact with said surface portion and movable on it along said inclined direction, said surface portion having a concave cross-section for providing a seat for said ball-shaped element and guiding it along said inclined direction.

2. A gauge according to claim 1, wherein the concave cross-section of said surface portion is Vee shaped.

3. A gauge according to claim 2, wherein said connection element is resiliently deformable.

4. A gauge according to claim 3, wherein said connection element has substantially a cylindrical shape and is flexible.

5. A gauge according to claim 4, wherein said connection element comprises a flexible stem having an end coupled to said ball-shaped element and another end coupled to said movable rod.

6. A gauge according to claim 3, wherein said elongate element comprises a rigid stem having an end coupled to said ball-shaped element and another end coupled to said connection element.

7. A gauge according to claim 6, wherein said connection element has substantially a cylindrical shape and is flexible.

8. A gauge for checking linear dimensions of parts, comprising:

a hollow casing;

a transducer unit coupled to the casing and including a member movable along a longitudinal direction and bias means for biasing said member along said longitudinal direction;

a substantially ball-shaped element movable with respect to said casing depending on variations of said linear dimensions along a direction transverse to said longitudinal direction;

an abutment member coupled to the casing, internally to it, and defining a surface portion elongate along a second direction inclined with respect to said longitudinal direction, said ball-shaped element being in contact with said surface portion and movable on it along said inclined direction; and an elongate element, substantially arranged along said longitudinal direction, carrying at a first end said ball-shaped element, having a second end coupled to said movable member by a connection element, said connection element permitting said ball-shaped element to perform displacements with respect to said movable rod, the connection element having a shape symmetrical about a geometrical axis lying substantially along said longitudinal direction, said connection element being configured to permit the ball-shaped element to perform said displacements substantially along all directions perpendicular to said longitudinal direction, wherein said surface portion has a concave cross-section for providing a seat for said ball-shaped element and guiding it along said inclined direction and the gauge comprises at least two feelers, externally protruding with respect to the casing, for checking internal diameters.

9. A gauge according to claim 8, wherein said casing includes a hollow protection member, said abutment member being rigidly coupled to said protection member, and said at least two feelers include said ball-shaped element and at least another feeler, said at least another feeler being fixed to said protection member.

10. A gauge according to claim 8, wherein the concave cross-section of said surface portion is Vee shaped.

11. A gauge according to claim 10, wherein said elongate element comprises a rigid stem having an end coupled to said ball-shaped element and another end coupled to said connection element.

12. A gauge according to claim 8, further including a substantially cylindrical hollow protection member fixed to said hollow casing and defining at least one lateral opening for feeler passage, and wherein sold hollow casing defines ducts for introducing pressurized air into the hollow casing, the ducts being in communication with said opening, the pressurized air escaping through said opening.

13. A gauge for checking linear dimensions of parts, comprising:

a hollow casing including a first support and a second support carried by the first support through an oscillating coupling;

a transducer unit fixed to the second support and including a member movable along a longitudinal direction and bias means for biasing said member along said longitudinal direction;

a substantially ball-shaped element movable with respect to said casing depending on variations of said linear dimensions along a direction transverse to said longitudinal direction;

an abutment member fixed to the second support, internally to it, and defining a surface portion elongate along a second direction inclined with respect to said longitudinal direction, said ball-shaped element being in contact with said surface portion and movable on it along said inclined direction; and an elongate element, substantially arranged along said longitudinal direction, the elongate element carrying at a first end said ball-shaped element and having a second end coupled to said movable member, wherein said surface portion has a concave cross-section for providing a seat for said ball-shaped element and guiding it along said inclined direction and the gauge comprises at least two feelers, externally protruding with respect to the casing, for checking internal diameters, said at least two feelers including said ball-shaped element and at least another feeler, said at least another feeler being fixed to said second support.

14. A gauge for checking linear dimensions of parts, comprising:

a hollow casing;

a transducer unit rigidly fixed to said casing and including a member movable along a longitudinal direction and bias means for biasing said member along said longitudinal direction;

a substantially ball-shaped element movable with respect to said casing depending on variations of said linear dimensions along a direction transverse to said longitudinal direction;

an abutment member coupled to said casing, internally to it, through a connecting device including a fulcrum device, and defining a surface portion elongate along a second direction inclined with respect to said longitudinal direction, said ball-shaped element being in contact with said surface portion and movable on it along said inclined direction; and an elongate element, substantially arranged along said longitudinal direction, the elongate element carrying at a first end said ball-shaped element and having a second end coupled to said movable member, wherein said surface portion has a concave cross-section for providing a seat for said ball-shaped element and guiding it along said inclined direction and the gauge comprises at least two feelers, externally protruding with respect to the casing, for checking internal diameters, said at least two feelers including said ball-shaped element and at least another feeler, said at least another feeler being fixed to said abutment member.

15. A gauge for checking linear dimensions of parts, comprising;

a hollow casing;

a transducer unit rigidly fixed to said casing and including a member movable along a longitudinal direction and bias means for biasing said member along said longitudinal direction;

a substantially ball-shaped element movable with respect to said casing depending on variations of said linear dimensions along a direction transverse to said longitudinal direction;

an abutment member movably coupled to said casing, internally to it, through a connecting device including a fulcrum device, and defining a surface portion elongate along a second direction inclined with respect to said longitudinal direction, said ball-shaped element being in contact with said surface portion and movable on it along said inclined direction; and an elongate element, substantially arranged along said longitudinal direction, the elongate element carrying at a first end said ball-shaped element and having a second end coupled to said movable member, wherein said surface portion has a concave cross-section for providing a seat for said ball-shaped element and guiding it along said inclined direction and the gauge comprises at least two feelers, externally protruding with respect to the casing, for checking internal diameters, said at least two feelers including a feeler fixed to said abutment member and another feeler fixed to a movable reference element defining a flat reference surface, said ball-shaped element being arranged between and in movable contact with said reference surface and said surface portion.

16. Gauge for checking linear dimensions of mechanical parts comprising:

a support casing substantially arranged along a longitudinal direction; a transducer unit fixed to the support casing and including a movable rod, substantially movable along said longitudinal direction; a first feeler including a substantially ball-shaped element, movable depending on variations of said linear dimensions along a direction transverse to said longitudinal direction; an elongate element, substantially arranged along said longitudinal direction, the elongate element carrying at a first end said ball-shaped element and having a second end coupled to said movable rod; and an abutment member fixed to the support casing and defining a surface portion arranged along a direction inclined with respect to said longitudinal direction and transverse direction, said ball-shaped element being in contact with said surface portion and movable on it along said inclined direction, characterized in that said surface portion has a concave cross-section for providing a seat for said ball-shaped element and guiding it along said inclined direction and the gauge comprises a second feeler fixed to said support casing, the gauge further including a support device carrying said support casing through an oscillating coupling device, for checking external diameters by said ball-shaped element and second feeler.

* * * * *